United States Patent
Baker, Jr.

(10) Patent No.: US 7,058,693 B1
(45) Date of Patent: *Jun. 6, 2006

(54) SYSTEM FOR PROGRAMMING A PROGRAMMABLE LOGIC CONTROLLER USING A WEB BROWSER

(75) Inventor: Richard A. Baker, Jr., West Newbury, MA (US)

(73) Assignee: Schneider Automation Inc., North Andover, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/524,171

(22) Filed: Mar. 13, 2000

Related U.S. Application Data

(63) Continuation-in-part of application No. 09/303,458, filed on Apr. 30, 1999, now Pat. No. 6,151,625, which is a continuation-in-part of application No. 08/927,005, filed on Sep. 10, 1997, now Pat. No. 6,228,454.

(51) Int. Cl.
*G06F 15/16* (2006.01)

(52) U.S. Cl. .............................. 709/217; 700/65; 700/7; 700/17

(58) Field of Classification Search .................. 700/17, 700/83; 709/218, 217, 220; 717/146, 100; 714/46
See application file for complete search history.

(56) References Cited

U.S. PATENT DOCUMENTS

| | | | |
|---|---|---|---|
| 3,971,000 A | 7/1976 | Cromwell | |
| 4,251,858 A | 2/1981 | Cambigue et al. | |
| 4,319,338 A | 3/1982 | Grudowski et al. | |

(Continued)

FOREIGN PATENT DOCUMENTS

| | | |
|---|---|---|
| DE | 296 00 609 U1 | 3/1997 |
| DE | 441 0 171 C1 | 4/1997 |
| DE | 196 15 093 A1 | 10/1997 |
| DE | 0 814 393 A1 | 12/1997 |
| EP | 0 542 657 A1 | 5/1993 |
| JP | 60192447 A | 9/1985 |
| WO | WO 97-18636 | 5/1997 |
| WO | WO 98/53581 | 11/1998 |

OTHER PUBLICATIONS

*Abstract of "Simulation on the integration of process control systems of rolling mill plants through standard networks," Choo Young Yeol, Hwang Hwa Won and Kim Cheeha, Proceedings of the Industrial Computing Conference, Instrument Society of America, Research Triangle Park, NC, USA. P 1–14; vol. 6, No. 1, 1996.

(Continued)

*Primary Examiner*—John Follansbee
*Assistant Examiner*—Dustin Nguyen

(57) ABSTRACT

A control system includes an Internet web interface to a network of at least one programmable logic control system running an application program for controlling output devices in response to status of input devices. The Web interface runs Web pages from an Ethernet board coupled directly to the PLC back plane and includes an HTTP protocol interpreter, a PLC back-plane driver, a TCP/IP stack, and an Ethernet board kernel. The Web interface provides access to the PLC back plane by a user at a remote location through the Internet. The interface translates the industry standard Ethernet, TCP/IP and HTTP protocols used on the Internet into data recognizable to the PLC. Residing in the PLC is a programming package accessible to a user through this interface which will allow the user to edit programs controlling the operation of the programmable logic controller system.

20 Claims, 4 Drawing Sheets

U.S. PATENT DOCUMENTS

| | | |
|---|---|---|
| 4,688,167 A | 8/1987 | Agarwal |
| 4,701,845 A | 10/1987 | Andreasen et al. |
| 4,845,644 A | 7/1989 | Anthias et al. |
| 4,858,152 A | 8/1989 | Estes |
| 4,897,777 A | 1/1990 | Janke et al. |
| 4,912,623 A | 3/1990 | Rantala et al. |
| 4,937,777 A | 6/1990 | Flood et al. |
| 4,949,274 A | 8/1990 | Hollander et al. |
| 4,953,074 A | 8/1990 | Kametani et al. |
| 4,974,151 A | 11/1990 | Advani et al. |
| 4,979,107 A | 12/1990 | Advani et al. |
| 4,992,926 A | 2/1991 | Janke et al. |
| 5,012,402 A | 4/1991 | Akiyama |
| 5,023,770 A | 6/1991 | Siverling |
| 5,047,959 A | 9/1991 | Phillips et al. |
| 5,072,356 A | 12/1991 | Watt et al. |
| 5,072,412 A | 12/1991 | Henderson, Jr. et al. |
| 5,109,487 A | 4/1992 | Ohgomori et al. |
| 5,122,948 A | 6/1992 | Zapolin |
| 5,131,092 A | 7/1992 | Sackmann et al. |
| 5,134,574 A | 7/1992 | Beaverstock et al. |
| 5,151,896 A | 9/1992 | Bowman et al. |
| 5,151,978 A | 9/1992 | Bronikowski et al. |
| 5,157,595 A | 10/1992 | Lovrenich |
| 5,159,673 A | 10/1992 | Sackmann et al. |
| 5,161,211 A | 11/1992 | Taguchi et al. |
| 5,165,030 A | 11/1992 | Barker |
| 5,168,441 A * | 12/1992 | Onarheim et al. ............ 700/17 |
| 5,179,700 A | 1/1993 | Aihara et al. |
| 5,225,974 A | 7/1993 | Mathews et al. |
| 5,245,704 A | 9/1993 | Weber et al. |
| 5,251,302 A | 10/1993 | Weigl et al. |
| 5,283,861 A | 2/1994 | Dangler et al. |
| 5,297,257 A | 3/1994 | Struger et al. |
| 5,307,463 A | 4/1994 | Hyatt et al. |
| 5,321,829 A | 6/1994 | Zifferer |
| 5,343,469 A | 8/1994 | Ohshima |
| 5,349,675 A | 9/1994 | Fitzgerald et al. |
| 5,386,524 A | 1/1995 | Lary et al. |
| 5,398,336 A | 3/1995 | Tantry et al. |
| 5,406,473 A | 4/1995 | Yoshikura et al. |
| 5,420,977 A | 5/1995 | Sztipanovits et al. |
| 5,430,730 A | 7/1995 | Sepulveda-Garese et al. |
| 5,440,699 A | 8/1995 | Farrand et al. |
| 5,446,868 A | 8/1995 | Gardea et al. |
| 5,471,617 A | 11/1995 | Farrand et al. |
| 5,528,503 A | 6/1996 | Moore et al. |
| 5,598,536 A | 1/1997 | Slaughter, III et al. |
| 5,611,059 A | 3/1997 | Benton et al. |
| 5,613,115 A | 3/1997 | Gihl et al. |
| 5,623,652 A | 4/1997 | Vora et al. |
| 5,625,781 A | 4/1997 | Cline et al. |
| 5,699,350 A | 12/1997 | Kraslavsky |
| 5,734,831 A | 3/1998 | Sanders |
| 5,793,954 A | 8/1998 | Baker et al. |
| 5,805,442 A | 9/1998 | Crater et al. |
| 5,812,394 A * | 9/1998 | Lewis et al. ................... 700/17 |
| 5,862,391 A | 1/1999 | Salas et al. |
| 5,950,006 A | 9/1999 | Crater et al. |
| 5,975,737 A | 11/1999 | Crater et al. |
| 5,978,578 A * | 11/1999 | Azarya et al. .............. 717/100 |
| 5,982,362 A | 11/1999 | Crater et al. |
| 5,997,167 A | 12/1999 | Crater et al. |
| 6,016,523 A | 1/2000 | Zimmerman et al. |
| 6,028,866 A | 2/2000 | Engel et al. |
| 6,032,203 A | 2/2000 | Heidhues |
| 6,058,251 A | 5/2000 | Okamoto et al. |
| 6,061,721 A | 5/2000 | Ismael et al. |
| 6,122,670 A | 9/2000 | Bennett et al. |
| 6,151,625 A * | 11/2000 | Swales et al. .............. 709/218 |
| 6,151,640 A | 11/2000 | Buda et al. |
| 6,263,487 B1 | 7/2001 | Stripf et al. |
| 6,282,454 B1 | 8/2001 | Papadopoulos et al. |
| 6,370,569 B1 * | 4/2002 | Austin ........................ 709/217 |
| 6,505,341 B1 * | 1/2003 | Harris et al. ................ 717/100 |
| 6,618,754 B1 * | 9/2003 | Gosling ...................... 709/220 |

OTHER PUBLICATIONS

*Abstract of "Environmental waste control digest," Clayton H. Billings; Public Works vol. 127 No. 7, 6 pp, Jun., 1996.

*Abstract of "Mathematical model and optimization of furfural treating process," Tao Peng, Jinshuo Yu and Huihe Shao; Huadong Huagong Xueyuan Xuebao/Journal of East China Institute of Chemical Technology vol. 17 No. 1, p. 99–104; Feb. 1991.

*Abstract of "User's experience with software tools for process integration. General results" Stougie, L.; Roeterink, H.J.H.; Van Wijk, A.; Stikkelman, R.M.; Nov. 1996.

LabVIEW Graphical Programming for Instrumentation, Networking Reference Manual, 8 Copyright 1993, 1994 National Instruments Corporation, Part No. 320587B–01, Sep. 1994.

LabVIEW Graphical Programming for Instrumentation, Tutorial for Windows, 8 Copyright 1993, 1994 National Instruments Corporation, Part No. 320593B–01, Sep. 1994.

LabVIEW Graphical Programming for Instrumentation, Data Acquisition VI Reference Manual for Windows, 8 Copyright 1992, 1994 National Instruments Corporation, Part No. 320536B–01, Sep. 1994.

Statement of Ken Crater pertaining to awareness of LABTECHnet technology, 1 page, Oct. 1995.

Walid Mostafa, Mukesh Singhal, "*A Taxonomy of Multicast Protocols For Internet Applications*," Jul. 18, 1997 from Computer Communications 20 (1998) 1448–1457.

Tilo Klesper, "Der Internet–Zugriff aufs LON," Aug. 1998 from Automatisieren.

*P802.1p/D4 Sep. 6, 1966 "P802.1p Standard for Local and Metropolitan Area Networks—Supplemental to Media Access Control (MAC) Bridges: Traffic Class Expediting and Dynamic Mulitcast Filtering".

Remote Interrogation and Control of Sensors via the Internet, Sensors and Systems; Peter L. Fuhr and Euan F. Mowat; University of Vermont; pp. 25–30; Dec. 1999.

Aug. 1996 CONTROL Magazine—In The News—Electric Utility Industry Embarks on Automation Overhaul, pp. 1–10.

Jul. 1997 CONTROL Magazine—Magazine Software Review—NT Package Give Plant Access Through the Web, pp. 1–3.

Oct. 1996 CONTROL Magazine—Software Review—Article Archives, pp. 1–2.

ICS Instrumentation & Control Systems—Windows NT for real–time control: Which way to go?—ICS Magazine, pp. 1–8, Nov. 1997.

I&CS Jul. 1999—Special Report Software—Software: Open source OSs, objects, Web–based communications challenge status quo, (Wayne Labs, Senior Technical Editor), pp. 24–49.

Rockwell International Corporation—Allen–Bradley—Networks—Ethernet for Industrial Control—An Ethernet White Paper—Apr. 21, 1998, pp. 1–13.

Rockwell International Corporation—Automation Systems Control—General—World–Class Automation System from Allen–Bradley, Last Updated: May 7, 1998, pp. 1–12.

YAHOO! Personalized Search Results for programmable logic controller internet access, pp. 1–3, Jan. 1999.

CONTROL Magazine Aug. 1998—Field Test—Dynamic Software Makes Control Integration Easier, pp. 1–2.

"Ethernet Base Gateway Product," AEG–Modicon, published Oct. 1991.

"TCP/IP Illustrated, vol. 2, The Implementation," Gary R. Wright, W. Richard Stevens, Oct. 1997.

U.S. patent application No. 08/927,005 for "Web Interface to Programmable Controller;" Inventor: Papadopoulos, Now Issued as Patent 6,282,454.

*Abstract of "Implementing distributed controls for FMC's using Internet utilities," S. S. Jagdale and N. Merchant; Computers of Inustrial Engineering, vol. 31, No. 1–2, p. 87–90; Oct., 1996 (UK).

*Abstract of "Process control takes to the Net,"G. Paula; Mechanical Engineering, vol. 118, No. 12, p. 55, Dec., 1996.

*Abstract of "Remote interrogation and control of sensors via the internet," Peter L. Furh and Euan F. Mowat; Sensors, vol. 12, No. 12, 6 pp; Dec. 1995.

*Abstract of "Chemical–better batch controls," T. Crowl; Control & Instrumentation, vol. 28, No. 5, p. 53–4, May 1996 (UK).

*Abstracts of "Industrial software does 32–bit Windows, prepares for the net," W. Labs; I 8CS, vol. 69, No. 3, p. 23–6, 31–4, Mar. 1996, USA.

*Abstract of "Control system design V. Communications orchestrate process control," F. Glow; In Tech, vol. 36, No. 9, p. 68–74, Sep. 1989.

*Abstract of "Functions and characteristics of local networks adapted to industrial applications," J. Morlais; Electronique Industrielle, No. 97, p. 56–63, Nov. 15, 1985; France.

*Abstract of "Intelligent supervisory control of submerged–arc furnaces," Markus A. Reuter, Carla Pretorius, Chloe West, Peter Dixon and Morne Oosthuizen, JOM vol. 48, No. 12, Dec. 1996, p. 49–51.

*Abstract of "Need low–cost networking consider DeviceNet," W. H. Moss; InTech vol. 43:11; p. 30–31, Nov. 1996.

*Plastic Car Bodies Pass the Crash Test, mechanical engineering vol. 118, No. 12; Dec. 1996.

RFC 1533 "DHCP Options and BOOTP Vendor Extensions, "(http://ietf.org/rfc/rfc1533.txt) IETF, Oct. 1993).

RFC 1543 "Interoperation between DHCP and BOOTP," (http://ietf.org/rfc/rfc1534.txt) IETF, Oct. 1993.

RFC 2131 "Dynamic Host configuration Protocol," (http://ietf.org/rfc/rfc21231.txt) IETF, Mar. 1997.

SOAP, Simple Object Access Protocol (1.1) W3C Note May 8, 2000, (http://www.w3.org/TR/2000/NOTE--SOAP-20000508).

*David J. Preston, "Internet Protocols Migrate to Silicon For Networking Devices" from Electronic Design, Apr. 14, 1997.*

SOAP, [online], [retrieved on Aug. 5, 2002]. Retrieved from MSDN Online—Default Home Page using Internet <URL:http://msdn.microsoft.com/nhp/ default.asp?contentid=28000523&frame= true>.

PROCOMM Plus—The Leader in terminal emulation, [online], [retrieved on Jan. 13, 2002]. Retrieved from the consumer web page of Symantec, Inc. using Internet <URL:http://www.symantec.com/procomm>.

DEC Terminals—The DEC VT100 and Its Successors, [online], 1999 Richard Shuford, [retrieved on Jan. 13, 2002]. Retrieved from DEC Video Terminals—The VT100 and Its Successors using Internet <URL:http: //www.cs.utk.edu/~shuford/terminal/dec.html>.

Skonnard, Aaron, SOAP: The Simple Object Access Protocol, [online], [retrieved on Jul. 30, 2002]. Retrieved from SOAP: The Simple Object Access Protocol—MIND Jan. 2000 using Internet <URL: http://www.microsoft.com/Mind/0100/soap/soap.asp>.

Extensible Markup language (XML)—W3C Working Draft Aug. 7, 1997, [online], [retrieved on Aug. 1, 2002]. Retrieved from Extensible Markup Language (XML) website using Internet <URL:http://www.w3.org/TR/WD–xml–970807.htm>.

Multi–Tech Systems Granted Modem Firmware Upgrade Patent, Apr. 5, 2000, [online], [retrieved on Jan. 3, 2002]. Retrieved from Multi–Tech Press Release using Internet <URL:http://www.multitech.com/NEWS/releases/2000/183.html>.

NetReach™ Model TPS–2, TelnetPower Switch 2001, [online], [retrieved on Jan. 13, 2002]. Retrieved from Model TPS–2 Telnet + Dial–Up Remote Power Manager, Remote Reboot of Servers, Route . . . using Internet <URL:http://www.wti.com/tps2.htm>.

ANSI.SYS, [online], [retrieved on Jan. 13, 2002]. Retrieved from ANSI.SYS—ansi terminal emulation escape sequences using Internet URL:http://enterprise.aacc.cc.md.us/~rhs/ansi.html>.

When Technology Standards Become Counterproductive, Kenneth C. Crater, President, Control Technology Corporation, Hopkinton, MA dated Jul. 9, 1999, pp. 1–5.

A White Paper State Language for Machine Control, Kenneth C. Crater, President, Control Technology Corporation, Hopkinton, MA dated Jul. 9, 1999, pp. 1–11.

Mach J. Company, MachJ, an enbeddable, clean room Java Virtual Machine, p. 1.

Control Engineering Online Magazine Articles (Jul. 1998)—No. that's not a PC, it's a PLC, pp. 1–2.

PC Quest, Dec '97—Point, click, Control—C–Programmable controllers take the pain out of embedded control, pp. 1–2.

Siemens—SIMATIC report 1/97—New in the SIMATIC Library, pp. 1–2.

"Modicon Modbus Plus Network BM85 Bridge Multiplexer User's Guide," Groupe Schneider, Aug. 1995.

"Modicon Modbus Plus Network Planning and Installation Guide," AEG Schneider Automation, Apr. 1996.

"Open Modbus/TCP Specification," A. Swales, Sep. 3, 1997.

"MEB Installation and Programming Manual," Niobrara Research and Development Corporation, Sep. 24, 1997.

"MEB–TCP Installation and Programming Manual," Niobrara Research and Development Corporation, Oct. 1, 1997.

"Internet Protocol, Darpa Internet Program, Protocol Specification—RFC:791," Defense Advanced Research Projects Agency, Sep. 1981.

"Transmission Control Protocol, Darpa Internet Program, Protocol Specification—RFC:793," Defense Advanced Research Projects Agency, Sep. 1981.

"Open MODBUS/TCP Specification," *A. Swales*, Sep. 3, 1997.

"[comp.unix.programmer] Unix–Socket–FAQ For Network Programming," Vic Metcalfe, Andrew Gierth and other contributors, Jan. 22, 1998.

"Winsock 2 Information," Bob Quinn, 1995–1998 (last updated Dec. 5, 1998).

* cited by examiner

SYSTEM FOR PROGRAMMING A PROGRAMMABLE LOGIC CONTROLLER USING A WEB BROWSER

RELATED APPLICATION

This application is a continuation-in-part of U.S. patent application. Ser. No. 09/303,458, file Apr. 30, 1999 now U.S. Pat. No. 6,151,625, which is a continuation-in-part of U.S. patent application Ser. No. 08/927,005, file Sep. 10, 1997 now U.S. Pat. No. 6,282,454. This application is also related to the following, commonly assigned application, entitled "Apparatus for Controlling Internetwork Communications," U.S. patent application No. 08/926,837, now U.S. Pat. No. 6,321,272. The contents of these patents are expressly incorporated herein by reference.

TECHNICAL FIELD

Applicants' invention relates generally to the field of programmable controllers and more particularly to a system for coupling a network of programmable controllers through an internetwork to a monitoring and control device.

BACKGROUND OF THE INVENTION

Remote monitoring and control of systems and processes have taken many forms. In the past, dedicated lines became the most common forms of communication between a control system and a remote location. This has limited application since the control system was not accessible from multiple locations. Modems have made it possible to access the control system from different locations, but these types of systems are generally restricted to downloading and uploading data files. Providing any type of control function between locations is rather limited In this type of environment. Further, an end user generally required a customized interface to access the control system.

With the growth of Internet, and its World Wide Web providing a deliver platform for organizing Internet data through hypertext links, a client server system can be designed that will give each end user the same type of a user friendly interface with the same universal access to services on the Web. The Web is a network of documents called sites or pages stored on server computers throughout the world Each page will usually contain text, some type of multimedia offerings such as graphic images, video, or audio, and possible hypertext links to other documents. A browser allows a user to read the pages and interact with the choices associated with it. The browser is a graphical software program that sends commands to the Internet Web site and displays whatever information is available on the page. Various browser programs are commercially available from different manufacturers.

The Internet network employs methods designed to handle thousands of general purpose computers sharing a single cable, and therefore has no ability to differentiate traffic in terms of its purpose or the criticality of its data. The Internet is no longer a network of computers sharing a single cable, but rather a web of interconnected point to point links involving both general purpose stations and specialized infrastructure components such as routers and firewalls.

The type of personal computer or work station used by the end user to connect to the Web is of no regard. Communication over the Internet and other networks requires one of several types of protocols. Protocols such as Internet Protocol (IP) provide for file transfers, electronic mail, and other services. A Sun Microsystem programming language known as Java, along with Hypertext Markup Language (HTML) used in designing layouts and graphics for a Web site or page has extended Internet technology such that a web site can be used for dynamic applications, commonly called applets, that can be downloaded and run by the end user. These applets are interpreted and run within a Web browser and have been generally restricted to word processing and similar uses. Downloading and running applets can be slow in comparison to other types of compiled languages. Security rules imposed on a browser and enforced by the underlying JAVA language prevent applets from obtaining certain data from any other device other than the Web server itself, Programmable logic controllers (PLCs) are widely used in industry and process control. Many manufacturers provide factory automation information using Microsoft Windows and other types of communication networking environments. These networks are usually slow, are not universally accessible and are limited to monitoring and data exchange. Control may be implemented, but since the communication networks are non-deterministic, control is not real time. Specialized industrial networks using proprietary fieldbus alternatives can be very expensive. Conversion products are required to allow information carried over those networks to be visible on a general purpose network. There are significant installation and other deployment costs associated with the existence of such intermediate devices. Firewalls between the Web server and the application are designed to solve problems of security and are not designed for high performance.

Programming the PLCs in these environments has many shortcomings. With many different PLCs possible in an integrated control system, making changes or updates may be difficult and expensive. The programming package is usually sold separate from the PLC. The user may need to purchase and maintain separate programming packages and may need training for each programming package. The package may have a different look and feel from others within the control system.

It would be desirable to develop an automation control system whereby-an user could use general, commercial networks such as the Internet in place of specialized industrial networks to remotely monitor and program automation control devices such as PLCs.

SUMMARY OF THE INVENTION

Accordingly, the principal object of the present invention is to provide an interface between an industrial control system and a Web browser coupled to a network such as Internet.

Another object of the present invention is to provide remote access through a web browser to information and data contained in an industrial control system having a Programmable Logic Controller.

A further object of the present invention is to provide remote programmability of a Programmable Logic contained in an industrial control system.

In the preferred embodiment of the invention, the invention allows for easy access over a commercial network such as Internet to information within a programmable logic controller (PLC). Access can be made locally or worldwide using a commercial Web browser. The invention is comprised of a control system of essential elements including, but not limited to a Web interface, a local network, and a network interface to at least one PLC control system running an application program for controlling output devices in response to status of input devices. The Web interface runs Web pages from an Ethernet board coupled directly to the PLC back plane and includes an hypertext transfer protocol (HTTP) interpreter, a PLC back plane driver, a Transmission Control Protocol/Internet Protocol (TCP/IP) stack, and an Ethernet board kernel. The Web interface provides access to the PLC back plane by a user at a remote location through the Internet. The interface translates the industry standard Ethernet, TCP/IP and HTTP protocols used on the Internet into data recognizable to the PLC. Using this interface, the user can retrieve all pertinent data regarding the operation of the PLC, including PLC configuration, Input/Output (I/O) and register status, operating statistics, diagnostics, and distributed I/O configurations. Updates to operating software can also be downloaded through the Internet access. Residing in the PLC is a programming package accessible to a user through this interface which will allow the user to edit programs controlling the operation of the programmable logic controller system.

Other features and advantages of the invention, which are believed to be novel and nonobvious, will be apparent from the following specification taken in conjunction with the accompanying drawings in which there is shown a preferred embodiment of the invention. Reference is made to the claims for interpreting the full scope of the invention which is not necessarily represented by such embodiment.

DETAILED DESCRIPTION

Although this invention is susceptible to embodiments of many different forms, a preferred embodiment will be described and illustrated in detail herein. The present disclosure exemplifies the principles of the invention and is not to be considered a limit to the broader aspects of the invention to the particular embodiment as described.

Figure 1:
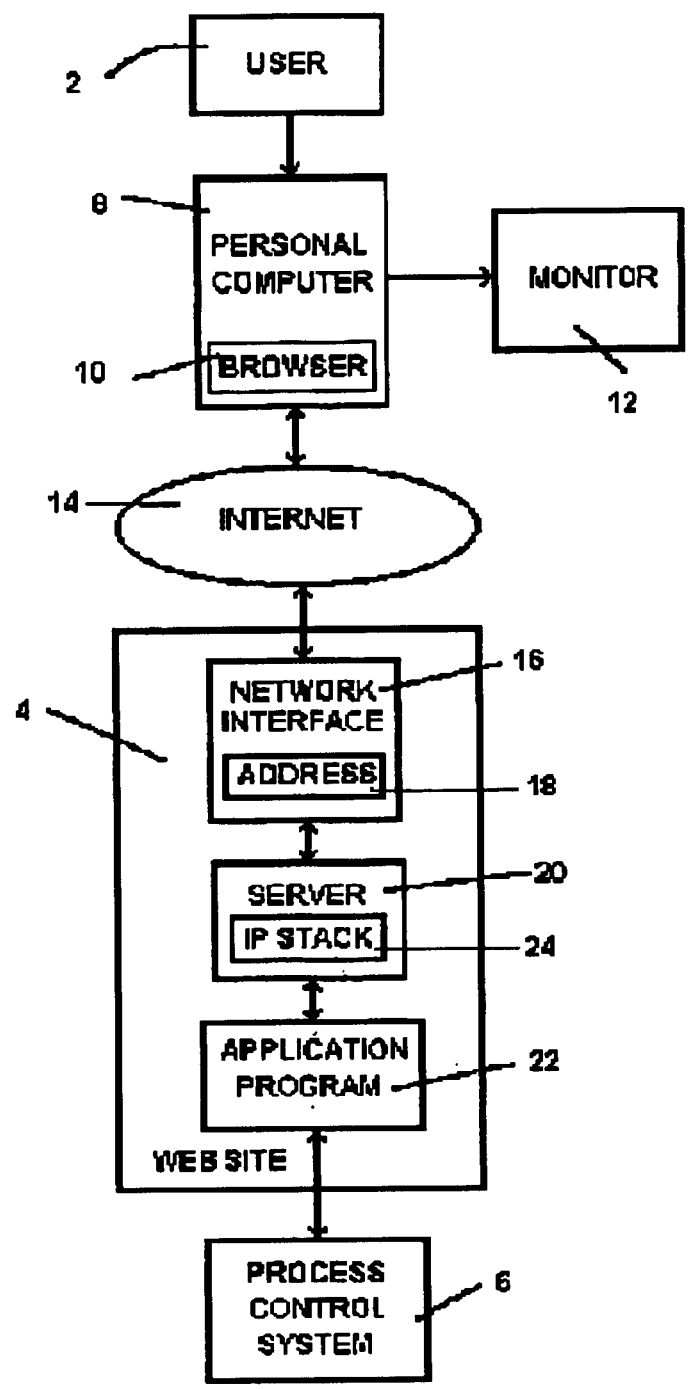
FIG. 1 shows an overview block diagram of a typical system illustrating the relationship between an user at a remote location and an Internet Web site used for monitoring a process control system according to the present invention.

FIG. 1 shows an overview block diagram of typical system illustrating the relationship between an user 2 at a remote location and an Internet web site 4 used for monitoring a process control system 6. The user 2 will have a personal computer (PC) 8 having a commercially available browser 10, such as Netscape Communication's Navigator or Microsoft's Internet Explorer, installed for viewing the contents at the web site 4 by a monitor 12 through a network, such as the Internet 14. The PC provides a remote human-machine interface (HMI) to the process control system 6. Various interconnection services are readily available to provide the physical and electrical interconnection from the PC to the Internet 14 Itself. The Internet 14 is a collection of independent world wide communication networks that are interconnected to each other and function as a single connectionless entity. Communication is based on a client-server basis, using a number of established protocols that allow for communication and file transfers between the client and the server. The most widely used protocol is Internet Protocol (IP).

The web site 4 includes a network interface 16 having an unique Internet address 18, a server 20, and an application program 22. The server 20 acts as a hypertext transfer protocol (HTTP) interpreter which uses Transmission Control Protocol (TCP) in conjunction with Internet Protocol, through a Transmission Control Protocol/Internet Protocol (TCP/IP) stack 24 to interact with the network interface 16 and the application program 22. This enables the data transfer between the application program 22 and the user 2 through the Internet 14. The application program provides data from the process control system 6. This data can be used to monitor the control process by the user 2 at the remote location. The TCP/IP stack 24 enables data transfers over the Internet 14 between the user 2 and the web site 4 as required for the various layers specified by the IP protocol.

The user 2 can connect to the Internet 14 using one of a number of Internet service providers and will enter the address of the web site 4 when connected. The web site 4 will display a home page which may contain text, some type of multimedia offerings such as graphic images, video, or audio, and possible hypertext links to other documents. The browser 10 will allow the user 2 to read the page and interact with the choices associated with it. The browser 10 will send commands to the web site 4 which will use the application program 22 to display whatever information is available from the process control system B. The browser 10 functions as a remote human-machine interface or HMI control of the process control system as will be detailed below.

Figure 2:
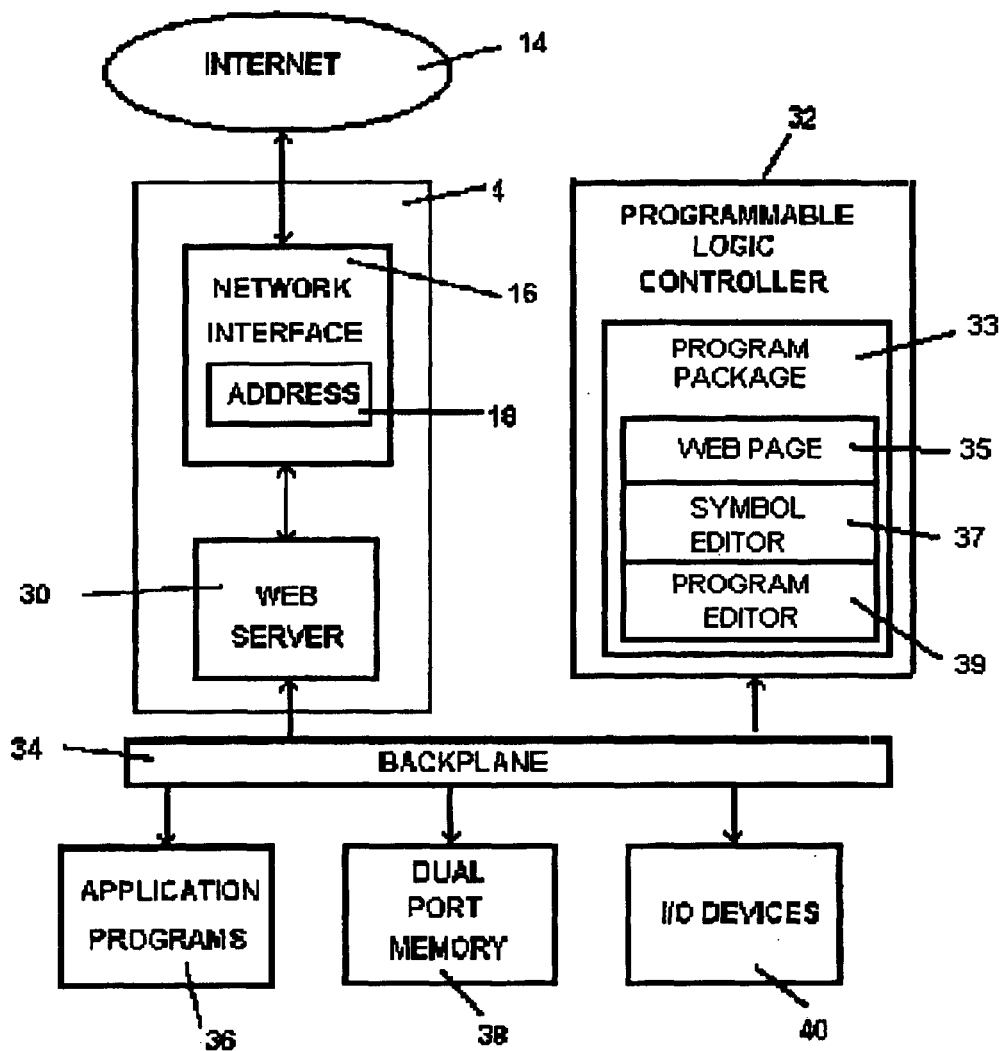
FIG. 2 is a basic block diagram of the present invention illustrating an Internet Interface to a programmable logic controller system.

FIG. 2 shows a basic block diagram of the present invention illustrating the Internet interface to a programmable logic controller system. The web site 4 includes the network interface 16 having an unique Internet address 18 and a web server 30. The web server 30 provides the home page for the website. A firewall or security for the overall system can be included in the web server 30, but is generally maintained as part of the network interface 16. In addition to providing security for various pages at the site, the user can disable the web server 30. A password and user list is provided in initial configuration files stored in the web server 30 that are downloaded from a remote server. Protection of the configuration file is then provided by the remote server and the web server 30 through the password and the user list. The web server 30 provides a direct connection for a programmable logic controller (PLC) 32 to the Internet 14 by plugging the web server 30 into its back plane 34. The web server 30 provides both a client and server interface. All signals between the PLC 32 and the web server 30 are through the back plane 34 rather than over a set of cables which would normally have to be coupled to input/output modules that are themselves plugged into the back plane 34. The back plane signals include addressing, control, data, and power. The client interface allows a user to send commands to a remote node over the Internet and the server interface allows for processing commands that originated from a remote node. Controlling the PLC 32 from a remote HMI, essentially on a real time basis is possible by controlling the data flow through the web server 30.

Associated with the PLC 32 are its application programs 36, dual port memory 38 and Input/Output (I/O) modules 40. The application programs 36 include a ladder logic program for controlling the I/O modules 40. The web server 30 functions as a node on a TCP/IP network 42 allowing it to send commands to the PLC 32 and receive the response.

Although the TCP/IP network 42 in the preferred embodiment is an Ethernet network, other high level protocols could be used. Using a web browser at a remote location through the Internet 14, a user can control and view configuration Information of the PLC 32.

A programming package 33, using either Java or HTML resides in the PLC 32. It is based on Ethernet and Web technology and allows editing of the application programs 36 using the personal computer 8 by the user 2. The application programs 36 stored as either a ladder logic or an IEC 1131 language program, are viewed as PLC programs within the PLC 32, accessible using either the standard HTTP or custom PLC protocols that run over TCP/IP. The information needed to edit the PLC 32, including web pages 35 for the editing procedures, reside in the PLC 32 itself. The programming package 33 converts these application programs 36 to and from formats needed for editing with a browser. The programming package 33 also includes symbol editors 37 and language editors 39.

The user 2 will be able to view and edit the PLC application programs 36 from anywhere a browser is available. A firewall or security for the overall system, maintained as part of the network interface 16 that prevents unauthorized users from accessing the programming package 33.

In addition to providing the ability to edit the application programs 36, by providing a File Transfer Protocol (FTP) based view of the application programs 36, file backup and restore can be handled through standard programming tools, allowing the user to manage the application programs 36 directly and efficiently and to also use standard revision control software to manage the application programs 36. Further, since all the symbols are stored within the PLC, any personal computer can be used to edit the application programs 36.

Figure 3:
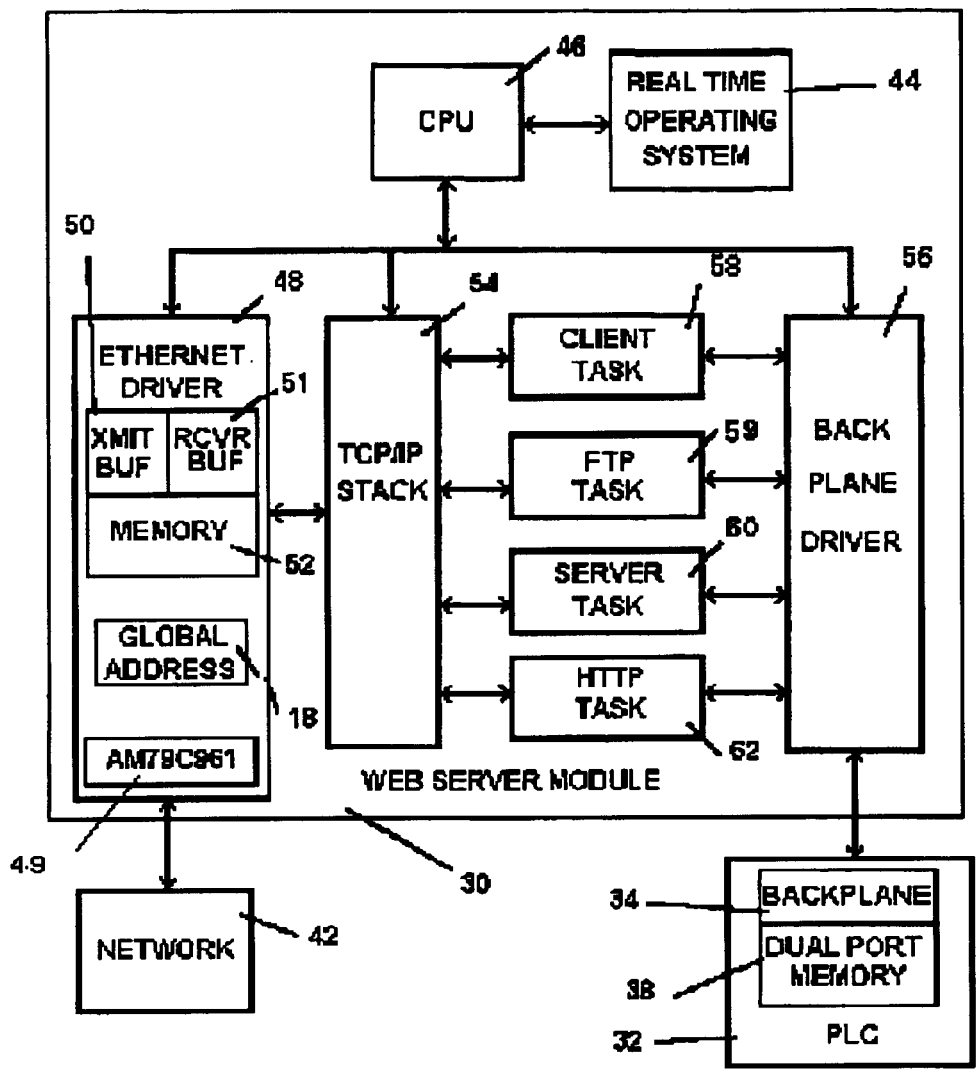
FIG. 3 is a block diagram of the Web server module illustrated in FIG. 2 according to the present invention.

The web server 30 is shown in greater detail in FIG. 3. Various components provide the required connectivity to perform its functionality. A real time operating system 44 controls the interaction between the components. The operating system 44 allocates processor time on a central processor unit (CPU) 46 to various tasks, provides memory management, and provides a set of message services and signal services. The message and signal services allow for communication between tasks, and between drivers and a task.

Connection to the TCP/IP network 42 is through an Ethernet driver 48 which transmits and receives messages at a rate of 10 Mbs (megabits per second) or faster via an Ethernet communication chip 49, such as, in the case of 100 Mbs Ethernet, a Crystal CS8952 available from Cirrus Logic, Inc. It is contemplated that in the future Ethernet communication chips capable of speeds of 1 Gbs (gigabits per second) and faster can be used. The physical connection over which communication is facilitated can be over a fiber optic cable or a twisted pair-type copper wire. In the case of 10 Mbs Ethernet over twisted pair-type copper wire, the copper wire and wire connections must conform to at least the Category 5 copper wire standard.

Alternatively, the TCP/IP stack 24 could be replaced by a dual TCP/IP stack. The dual TCP/IP stack comprises a first TCP/IP stack which provides support for a broad range of TCP/IP messages. The second TCP/IP stack is a "short stack" which manages high priority control messages between the PLC 32 and I/O modules 40. For outgoing TCP/IP messages, the appropriate TCP/IP stack would be chosen by an application program 36 associated with the PLC 32. On incoming TCP/IP messages, the TCP/IP message would be intercepted and examined to see if it is a TCP/IP message that is intended for the Modbus on Ethernet protocol, If it is a TCP/IP message intended for the Modbus on Ethernet protocol, then the message is delivered to the second stack. If it is not a TCP/IP message intended for the Modbus on Ethernet protocol, the first TCP/IP stack handles the message. In this manner, TCP/IP messages intended for the Modbus on Ethernet protocol are handled more quickly and efficiently than when a single TCP/IP stack is implemented.

The web server will have an unique global address 18, allowing it to be addressed by other devices on the network. The Ethernet driver 48 manages transmit 50 and receive 51 buffers in memory 52, and interfaces with the Ethernet communication chip 49. The transmit 50 and receive 51 buffers are shared both by the Ethernet communication chip 49 and the Ethernet driver 48. The Ethernet driver 48 also provides a transmit request interface and a receive indication interface to a TCP/IP stack 54. The Ethernet communication chip 49 provides a transmit queue interface, a receive queue interface, and generates interrupts on completion of transmitting a message, and on receiving a new message. The Ethernet driver 46 places receive buffers in the receive queue. In the interrupt routine, the Ethernet driver 46 examines the receive queue. If any messages are in the receive queue, it passes the receive buffer to the TCP/IP stack 54. The TCP/IP stack 54 copies the buffer, and sometime later calls the Ethernet driver 48 to return the buffer and place the returned buffer back into the receive queue.

The TCP/IP stack 54 calls the Ethernet driver 48 to transmit a message. The Ethernet driver 46 attempts to allocate a buffer from the shared memory 52. If it succeeds, it copies the message into the buffer, and places the buffer into the Ethernet communication chip 49 transmit queue. If there is no transmit buffer, then the driver drops the transmit message. In the interrupt routine, the Ethernet driver 48 examines the transmit queue, and frees the transmitted buffers.

The TCP/IP network 42 allows special MSTR (master) functions that allow nodes on the network to initiate message transactions. These MSTR functions include reading and writing data and are used for commands and responses. They allow programs running in the PLC 32 to send commands to a remote node on the TCP/IP network 42 and receive the responses. A back plane driver 56 sends commands and receives the response to the PLC 32 over the back plane 34.

The back plane driver 56 receives request from the PLC's ladder logic MSTR blocks stored in its memory 38. When a response is available, the back plane driver 56 passes it back to the MSTR block. The back plane driver 56 provides a client task 58, a FTP task 59, and server task 60 to the applications. The server task 60 interface allows an application to issue a request command to the PLC's 32 executive program and receive its response. The client task 58 allows an application to receive a new MSTR request and pass back the response to the ladder logic program. The FTP task 59 provides a FTP based view of the application programs 36, allowing the user to manage the application programs 36 directly and efficiently and to also use standard revision control software to manage the application programs 36.

The server task 60 uses a queuing mechanism and call back functions. An application queues both the request and the call back function associated with the request. When the back plane driver 56 services the request in its interrupt routine, it calls the associated call back function. The response and the original request is passed to the call back function. The call back function can call an operating routine to either pass a message or signal the application.

The client task 58 also uses queues and call back functions. The client application queues both an indication request on queue and a call back function associated with the request. When the back plane driver 56 detects a new MSTR block request in its interrupt routine, it calls the associated call back function. The request is passed into the call back function. The call back function can call an operating system routine to either pass a message or signal the application. If the back plane driver 56 detects that the MSTR block has been aborted, or is no longer being solved, it calls an user supplied associated abort call back function. The application calls a routine to pass the MSTR response and an associated call back routine to the driver. Sometime later, the driver passes back the response to the ladder logic program In its Interrupt service routine, and then calls the user supplied call back function.

The PLC 32 interfaces with the web server 30 hardware via the dual port memory 38. It reads and writes to the dual port memory 38 using an ASIC chip. Writing to a specified location will cause an interrupt. The PLC 32 first writes a message in the dual port memory 38, and then causes an interrupt. The message indicates a type of command. One type indicates that a MSTR block is being solved. Other types are used for passing requests to the PLC 32 and obtaining the responses to the requests. After the PLC 32 passes the message, it polls the dual port memory 38 for commands placed by the back plane driver 56. These commands are read memory, write memory, and processing is complete. The back plane driver 56 uses state machines to process the MSTR interrupts. The maximum number of active MSTR blocks is set at four in the present invention, requiting four state machines. When the back plane driver 56 receives a MSTR interrupt, it attempts to find an associated state machine that matches with the MSTR block. If there are already four outstanding transactions, no more are available, and the back plane driver 56 will set the MSTR's outputs to false. If a state machine is found, the back plane driver 56 determines if it is a new transaction, an outstanding transaction, or a response is available. If it is a new transaction it copies the request and calls the application's associated call back routine. If its an outstanding transaction, It indicates to the ladder logic program that the MSTR block is still busy. If a response is available, the back plane driver 56 copies the response, sets either the MSTR's completion or error output, and calls the application's call back routine.

Two interrupts are used for processing a request. On the first interrupt, called the preport interrupt, the back plane driver 56 copies the request into a data structure located in the PLC's 32 dual memory 38. On the second interrupt, called the end of scan interrupt, the back plane driver 56 copies the response from the controllers data structure into the user's buffer. It then calls the user's associated call back function.

The request for accessing the PLC's 32 registers is processed by the back plane driver 56 and is not sent to the PLC's executive program for processing. The back plane driver 56 determines the memory location in the memory 38 of the registers the PLC 32. At an end of scan interrupt, the back plane driver 56 processes the read/write register requests by sending commands via the dual port memory 38 to the PLC 32 to read or write the locations containing the registers. The back plane driver 56 will service a maximum of four read/write register requests at the end of a scan Interrupt.

A client task 58 interfaces with the TCP/IP stack 54, the back plane driver 56 and uses the operating system 44 message services. It processes the MSTR request. When the client task 58 receives a MSTR request from the back plane driver 56, it passes the request to the TCP/IP stack 54. When the TCP/IP stack 54 returns a response to the client task 58, it passes the response to the back plane driver 56. The TCP/IP stack 54 provides a Berkeley TCP/IP interface and a signal extension. The signal extension calls a user supplied function which passes in a socket number, a task ID, and an event. The signal function calls the operating system 44 to send a message to the task indicated by the task ID. It sends a message either to the client task 58 or server task 60. The client task 58 posts request indications to the back plane driver 56, and the associated call back routine calls the operating system 44 to send a message to the client task 58 for a new MSTR transaction.

The client task 58 manages multiple outstanding MSTR transactions using the state machines. There is a linked list of connection state machines. The connection state machines are used for establishing connection and closing connections. In addition each connection state machine contains a list of transaction state machines. Each transaction machine on the connection-state machine represents a transaction to a node represented by the connection machine. The transaction machines are used to send a request, and process the response. The client task 58 enters a loop after performing initialization. It calls the operating system 44 to receive a message. The operating system will block the client task 58 until there is a message or until there is a time out. It either receives a message from the TCP/IP stack 54, from a MSTR call back routine, or it times out. It process the message or the time out and then reenters the loop. If the message received from the operating system 44 is a new MSTR request, the client task will obtain a connection state machine, and places a new transaction machine at end of the list of the connection state machine's list. At this point the transaction machine will attempt to transmit the message. It may not be possible to transmit the message because no connection has been established, or the because the remote side may have applied flow control. If the message received from the operating system 44 is a TCP/IP event, the client task 58 finds the associated connection machine and determines if the TCP/IP event is an accepted connection, an aborted connection, or a received data event. Based on the connection state, and the transaction machine's state, the client task 58 processes the message to advance the transactions if there are any. Receiving data for the MSTR responses may occur over several TCP/IP events, and the transaction state machine assembles the data into a response. When the client task 58 requests the TCP/IP stack to transmit a message, not all of the message may be transmitted. This occurs when the remote node is flow controlled, which is explained below. If the call to the operating system 44 to receive a message returns with a time out, or if there is a message, the client task 58 searches the list of connection machines that are flowed controlled. For each flow controlled connection, it tries to advance the transaction state machines on the connection state machine list that are flow controlled.

The server task 60 processes a request originating from the user at the remote location. The server task 60 interfaces with the back plane driver 56, the TCP/IP stack 54, and the operating system's 44 message services. The server task 60 posts requests to the back plane driver 56, and an associated call back routine uses the operating system 44 message services to send the response to the server task 60. A TCP/IP stack 54 signal function also uses the operating system's 44 send service to send an TCP/IP event to the server task 60. The server task 60 can handle multiple transactions and connections. Like the client task 58, it maintains a list of connection machines, and each connection machine contains a list of transaction machines. The connection machines are for managing the connection and the transaction machines manage the incoming requests and responses.

The server task 60 enters a loop after performing initialization. It calls the operating systems 44 to receive a message. The operating systems 44 block the server task 60 until there is a message or until it times out. It either receives a message from the TCP/IP tasks 54 signal handler, from the back plane driver 56 or it times out. It processes the message or the time and reenters the loop. If the message received from the operating systems 44 is from the TCP/IP task's 54 signal handler, the server task 60 determines if the event is a connection request, a close socket event, or a receive data event. Based on the TCP/IP event, the server task 60 uses the connection machine and transaction machine to advance the transaction. Received data for a request may occur over several receive data events, and the transaction machine assembles the events into a request message. When the response message is received from the operating system 44, the server task 60 finds the connection and transaction machine in order to send the response.

When the server task 60 requests the TCP/IP stack 54 to transmit a message, not all of the message may be transmitted. This occurs when the remote node is flow controlled. If the call to the operating system 44 is to receive a message returns with a time out, or if there is a message, the server task 54 searches the list of connection machines that are flowed controlled. For each flow controlled connection, it tries to advance the transaction state machines on the connection state machine list that are flow controlled.

After the server task 60 has parsed the header of an incoming request, it attempts to allocate a structure to pass the request to the back plane driver 56. If the server task is already processing a predetermined number of outstanding requests, the attempt fails, the connection is placed into a blocked state, and the body of the request is not read from the TCP/IP stack 54. As a result the TCP/IP stack may apply flow control to the remote node. When one of the other requests is complete, the free data structure event causes a blocked connection machine to continue processing the incoming Modbus request.

The HTTP task 62 interfaces with the TCP/IP stack 54, and the back plane driver 56. The HTTP server task 62 receives a HTTP request from the TCP/IP stack 54. To process the request, it may access the PLC 32 through the back plane driver 56 and back plane 34. The HTTP server task 62 sends back the response over the TCP/IP stack 54. The framework is supplied by the operating system 44. The framework creates the HTTP task, accepts connection, and parses the HTTP request, After parsing the request, it calls the operating system 44 to process the request. Processing the request involves determining the request type and processing the actual request. The different request types allow a user to acquire a snapshot of the PLC 32 operations by allowing a view of various registers within the PLC 32 and dual memory 38. These request types also include display of the PLC 32 configuration, remote and distributed 10 and module health statistics, display registers, back plane configuration, Ethernet statistics, editing the PLC program, and others, as shown in Table 1:

TABLE 1

Show the home page
Show the programmable logic controller's configuration
Show the Ethernet statistics
Show the read register request page
Show the 4x registers
Show the racks attached to the controllers back plane
Send an image. The different images are gif files that are displayed on the various pages
Show the remote I/O statistics
Show the list of configured remote I/O drops
Show a remote I/O rack's configuration and health
Show a remote I/O drop's communication statistics
Show the I/O reference values of a remote I/O module
Show a list of configured distributed I/O nodes
Show the configuration and the health of a distributed I/O node
Show the I/O reference values of a distributed I/O module
Edit the PLC Program The home page contains hyperlinks to many pages of data. The configuration page will display the configuration of PLC 32. The remote I/O and distributed I/O module health status pages are a series of linked pages. The first page displays the communication health statistics at the Remote I/O and Distributed I/O head and contains a link to a configured drop page. The configured drop page displays a table containing drop numbers which are linked to a drop status page and rack numbers which are linked to the drop and rack configuration pages. Two tables are included in the drop status page, one for showing the communication status of the drop and the other for showing which racks are populated with the I/O modules. The drop and rack configuration page displays the I/O modules, their health, and slot location for the given rack. From a selected module, a user can view it's input and output values. Register data is displayed in a template having a form and a table, with the user entering an address and a length. The table will display the registers values A table showing option modules and their slot location is displayed on the back plane configuration page. The data appearing on the pages is static but can be automatically updated at preselected times.

The operating system 44 processes these requests and responds by sending HTTP messages through the TCP/IP stack 54. Processing some of these requests involves reading the PLC's traffic cop, registers, coils, or various page zero locations where statistics are kept To perform these reads, the operating system 44 sends a request to the back plane driver 56 and uses an event signal mechanism and event flags to determine when the request is complete. After sending the request to the back plane driver 56, the operating system 44 waits for an event flag to be sent. When the back plane driver completes the request, the back plane driver 56 calls a call back routine, which sets the event. The operating system 44 then resumes processing the request.

Figure 4:
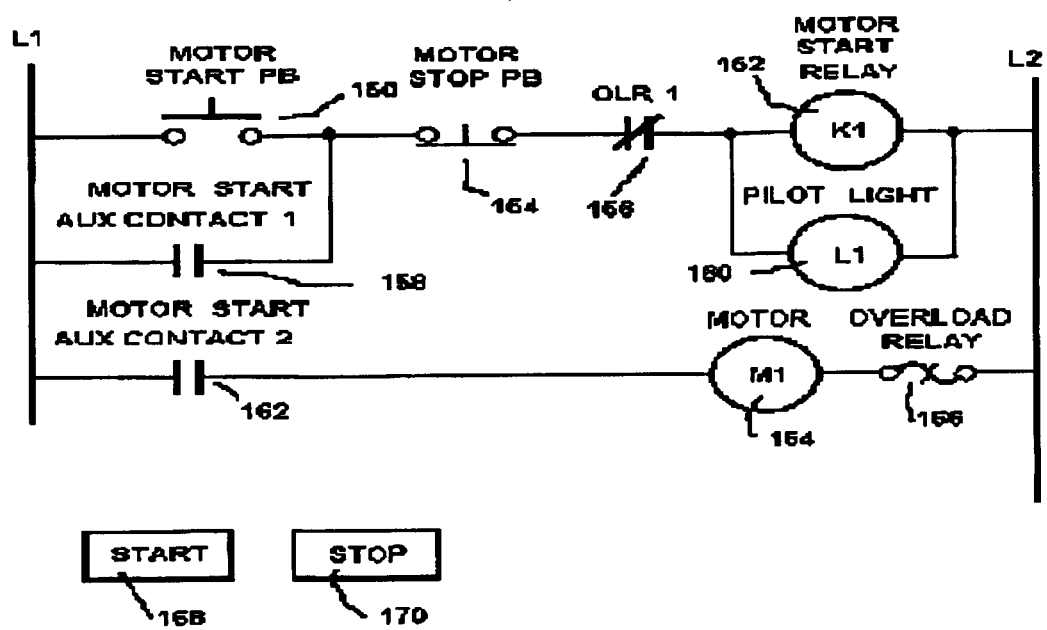
FIG. 4 is a typical mimic page available to a user at a remote location utilizing a browser which illustrates the present invention for monitoring a programmable controller system.

A mimic page which represents some of the hardware physically connected to a programmable logic controller system can be constructed utilizing the graphical editing technique that is part of the present invention. The present invention allows a user at a remote location, using a browser, to create, view, modify, and delete the mimic page and actually control various components illustrated in the mimic page. FIG. 4 shows a simple motor start-stop control in ladder logic diagram form that could be available as a mimic page to the user. Pushing a motor start push button 150 will cause a motor start relay 152 to energize through a normally closed stop push button 154 and a normally closed overload contact 156. Auxiliary motor start contact 158 will latch relay 152 after the start push button 150 is released and pilot light 160 will illuminate. Auxiliary motor start contact 162 will provide power to pump motor 164 which will remain running until stop push button 154 is depressed or overload relay 166 detects an overload condition. In this example, start push button 150, stop push button 154, overload contact 156, auxiliary motor start contacts 158 and 162, and overload relay 166 are inputs to the programmable logic controller system. Relay 152, pilot light 160, and pump motor 164 are outputs. The PLC will have the registers containing the animation data for the inputs and outputs. An application program in the PLC will respond to the inputs to control the outputs A user at a remote location will browse the Internet for the home page of the installation of the programmable logic controller system. The PLC will have other control functions as well and if the user has the necessary authorizations, various options will become available. The home page will allow the user to acquire a snapshot of the PLC operations by allowing a view of various pages that will allow access to registers within the PLC. Other pages will also include displays of the PLC's configuration, remote and distributed I/O modules health statistics, display registers, back plane configuration, Ethernet statistics and others as shown previously shown in Table 1.

The mimic diagram page will be called up on a browser screen which will allow the user to view the status of the system. The mimic diagram's light 160, relay 152, contacts 158, 162, and pump motor 164 will be updated to correspond to the state of the actual devices. The states of the inputs and outputs will then be shown on the ladder diagram which will be automatically updated as they are changed. Through the use of applets representing the start 150 and stop 154 buttons, the user could manually control start and stopping of the motor by using a mouse or keyboard to position a cursor and "clicking" on either the start 168 or stop 170 boxes.

While the specific embodiments have been illustrated and described, numerous modifications are possible without departing from the scope or spirit of the invention.

We claim:

1. A system for programming application programs controlling a programmable logic controller from a communication network, comprising:
   a. an interface module for coupling the programmable logic controller to the communication network;
   b. a program editor resident in the programmable logic controller, the program editor for creating and editing the application programs;
   c. at least one Web page resident in the programmable logic controller, the Web page linked to the program editor;
   d. wherein the Web page is accessible to a user at a remote location using a web browser coupled to the communication network through the interface module; and
   e. wherein the Web page allows the user at the remote location to access the program editor to edit the application programs controlling the programmable logic controller.

2. The system of claim 1 wherein the application programs are viewed as files within the programmable logic controller, accessible to the communication network using a standard File Transfer Protocol.

3. The system of claim 1 wherein the application programs are converted by the programming editor and viewed on a web browser through either Java or HTML.

4. The system of claim 3 wherein the programming editor further includes symbol editors and language editors and wherein all symbols are stored within the programmable logic controller, allowing any authorized personal computer coupled to the communication network to edit the application programs.

5. The system of claim 1 wherein the interface module includes
   a real time operating system operating a central processing unit,
   a network interface for communicating with the communication network,
   a driver for communicating with the programmable logic controller,
   a protocol stack,
   a client task for communicating with the protocol stack for initiating received requests,
   a server task for communicating with the protocol stack for responding to received requests, and
   a protocol task for communicating with the protocol stack for receiving and responding to protocol task requests.

6. The system of claim 5 wherein the communication network is a world-wide network known as the Internet using an Internet Protocol (IP).

7. The system of claim 6 wherein the interface module functions as a web site on the Internet, the interface module including a global IP address.

8. The system of claim 7 wherein the protocol stack is a Transmission Control Protocol stack and wherein the protocol task includes a server task using a hypertext transport protocol (HTTP) task to deliver hypertext documents to the network interface.

9. The system of claim 8 wherein the HTTP task accepts a connection, parses an HTTP request, and calls the real time operating system to process the request.

10. The system of claim 9 wherein the interface module further includes a dual TCP/IP stack for data transferring comprising a first stack capable of handling a broad range of TCP/IP messages and a second stack capable of handling a less broad range of TCP/IP messages more quickly than the first stack.

11. A system for programming application programs controlling a programmable logic controller from a communication network, comprising:
   a. means for coupling the programmable logic controller to the communication network;
   b. means resident in the programmable logic controller for creating and editing the application programs;
   c. at least one Web page resident in the programmable logic controller, the Web page linked to the creating and editing means resident in the programmable logic controller;
   d. wherein the Web page is accessible to a user at a remote location using a web browser coupled to the communication network through the coupling means; and
   e. wherein the Web page allows the user at the remote location to access the creating and editing means to edit the application programs controlling the programmable logic controller.

12. The system of claim 11 wherein the application programs are viewed as files within the programmable logic controller, accessible to the communication network using a standard File Transfer Protocol.

13. The system of claim 11 wherein the creating and editing means includes a programming package whereby the application programs are converted by the programming package and viewed as either Java or HTML.

14. The system of claim 13 wherein the programming package further includes symbol editors and language editors and wherein all symbols are stored within the programmable logic controller, allowing any authorized personal computer coupled to the communication network to edit the application programs.

15. The system of claim 11 wherein the coupling means includes an interface module, the interface module including a real time operating system operating a central processing unit, a network interface for communicating with the communication network, a driver for communicating with the programmable logic controller, a protocol stack, a client task for communicating with the protocol stack for initiating received requests, a server task for communicating with the protocol stack for responding to received requests, and a protocol task for communicating with the protocol stack for receiving and responding to protocol task requests.

16. The system of claim 15 wherein the communication network is a world-wide network known as the Internet using an Internet Protocol (IP).

17. The system of claim 16 wherein the interface module functions as a web site on the Internet, the interface module including a global IP address.

18. The system of claim 17 wherein the protocol stack is a Transmission Control Protocol stack and wherein the protocol task includes a server task using a hypertext transport protocol (HTTP) task to deliver hypertext documents to the network interface.

19. The system of claim 18 wherein the HTTP task accepts a connection, parses an HTTP request, and calls the real time operating system to process the request.

20. The system of claim 19 wherein the interface module further includes a dual TCP/IP stack for data transferring comprising a first stack capable of handling a broad range of TCP/IP messages and a second stack capable of handling a less broad range of TCP/IP messages more quickly than the first stack.

\* \* \* \* \*